United States Patent
Niskanen et al.

(10) Patent No.: US 8,670,124 B2
(45) Date of Patent: Mar. 11, 2014

(54) APPARATUS AND METHOD FOR CONVERTING SENSOR INPUT SIGNALS INTO DIGITAL OUTPUT SIGNALS

(75) Inventors: Antti Niskanen, Cambridge (GB); Hongwei Li, Cambridge (GB)

(73) Assignee: Nokia Corporation, Espoo (FI)

( * ) Notice: Subject to any disclaimer, the term of this patent is extended or adjusted under 35 U.S.C. 154(b) by 33 days.

(21) Appl. No.: 13/362,148

(22) Filed: Jan. 31, 2012

(65) Prior Publication Data

US 2013/0194578 A1 Aug. 1, 2013

(51) Int. Cl.
  *G01B 9/02* (2006.01)
(52) U.S. Cl.
  USPC ........... 356/450; 356/476; 356/477; 356/478; 356/479; 356/503; 359/245; 385/14; 385/39; 380/256; 250/225; 250/550
(58) Field of Classification Search
  USPC ............... 341/135–140; 385/14, 39; 380/256; 250/225, 227.14, 227.17, 550; 356/477, 503, 482, 485, 519, 491; 359/245
  See application file for complete search history.

(56) References Cited

U.S. PATENT DOCUMENTS

| | | | |
|---|---|---|---|
| 5,583,636 A * | 12/1996 | Bulow | 359/245 |
| 6,201,609 B1 * | 3/2001 | Hill et al. | 356/491 |
| 6,346,985 B1 | 2/2002 | Hall | 356/477 |
| 6,674,533 B2 * | 1/2004 | Price | 356/503 |
| 6,847,454 B2 * | 1/2005 | Crowley et al. | 356/479 |
| 7,852,475 B2 * | 12/2010 | Crafts et al. | 356/328 |
| 7,916,293 B2 * | 3/2011 | Mitchell et al. | 356/336 |
| 7,940,398 B2 * | 5/2011 | Ohbayashi et al. | 356/479 |
| 7,999,946 B2 * | 8/2011 | Andersen et al. | 356/479 |
| 2012/0133949 A1 * | 5/2012 | Niskanen | 356/477 |

FOREIGN PATENT DOCUMENTS

GB  2 339 016 A  1/2000

* cited by examiner

*Primary Examiner* — Lam T Mai
(74) *Attorney, Agent, or Firm* — Harrington & Smith (57) ABSTRACT

An apparatus, method and computer program wherein the apparatus includes at least one interferometer where the at least one interferometer is configured to cause interference of an electromagnetic input signal; wherein the at least one interferometer is configured to receive at least one sensor input signal from at least one sensor such that the sensor input signal controls the interference of the electromagnetic input signal by the at least one interferometer; wherein the at least one interferometer is configured to provide a plurality of outputs where each of the plurality of outputs is provided by the at least one interferometer responding to the at least one sensor input signal with a different sensitivity; and at least one detector configured to detect the plurality of outputs of the at least one interferometer and provide a digital output signal indicative of the at least one sensor input signal.

20 Claims, 4 Drawing Sheets

APPARATUS AND METHOD FOR CONVERTING SENSOR INPUT SIGNALS INTO DIGITAL OUTPUT SIGNALS

TECHNOLOGICAL FIELD

Embodiments of the present invention relate to an apparatus and method for receiving sensor input signals. In particular, they relate to an apparatus and method for receiving sensor input signals where the apparatus comprises at least one interferometer.

BACKGROUND

Sensors which may be configured to measure or detect physical variables are known. In order to enable the outputs of the sensors to be processed or used by an electronic apparatus it may be necessary to convert the sensor input signal into a digital format. It would be beneficial to have a simple apparatus which enables a digital output signal to be provided.

BRIEF SUMMARY

According to various, but not necessarily all, embodiments of the disclosure there is provided an apparatus comprising: at least one interferometer where the at least one interferometer is configured to cause interference of an electromagnetic input signal; wherein the at least one interferometer is configured to receive at least one sensor input signal from at least one sensor such that the sensor input signal controls the interference of the electromagnetic input signal by the at least one interferometer; wherein the at least one interferometer is configured to provide a plurality of outputs where each of the plurality of outputs is provided by the at least one interferometer responding to the at least one sensor input signal with a different sensitivity; and at least one detector configured to detect the plurality of outputs of the at least one interferometer and provide a digital output signal indicative of the at least one sensor input signal.

In some embodiments each of the different sensitivities provided by the at least one interferometers may have a value $2^{i-1}x$ where x is a value of a phase shift introduced by the at least one interferometers in response to a sensor input signal and N is the number of outputs provided and each of the outputs is associated with a unique positive integer value of i between 1 and N.

In some embodiments the digital output signal indicative of the at least one sensor input signal may comprise a series of digits where each digit is either a 0 or 1.

In some embodiments the apparatus may be configured to convert the digital output signal indicative of the sensor input signal into a binary format.

In some embodiments the apparatus may comprise a plurality of interferometers. The plurality of interferometers may be arranged in parallel with each other. The plurality of interferometers may be provided on a monolithic substrate or on a single chip.

In some embodiments the apparatus may comprise at least one interferometer which is configured to receive the same sensor input signal a plurality of times and provide a plurality of different output signals at different sensitivities.

In some embodiments the sensor input signals may control the interference of the electromagnetic input signal by the at least one interferometer by introducing a phase shift into the at least one interferometer.

In some embodiments the electromagnetic input signal may comprise a plurality of coherent components.

In some embodiments the electromagnetic input signal may be provided by a laser or a single photon.

In some embodiments the at least one detector may be configured to convert the plurality of outputs of the at least one interferometer from an electromagnetic signal to an electrical signal.

According to various, but not necessarily all, embodiments of the disclosure there is also provided a method comprising; receiving at least one sensor input signal from at least one sensor; configuring at least one interferometer to cause interference of an electromagnetic input signal where the interference of the electromagnetic input signal by the at least one interferometer is controlled by the sensor input signal; providing a plurality of outputs where each of the plurality of outputs is provided by the at least one interferometer responding to the at least one sensor input signal with a different sensitivity; and detecting the plurality of outputs of the at least one interferometer and providing a digital output signal indicative of the at least one sensor input signal.

In some embodiments each of the different sensitivities provided by the at least one interferometers may have a value $2^{i-1}x$ where x is a value of a phase shift introduced by the at least one interferometers in response to a sensor input signal and N is the number of outputs provided and each of the outputs is associated with a unique positive integer value of i between 1 and N.

In some embodiments the digital output signal indicative of the at least one sensor input signal may comprise a series of digits where each digit is either a 0 or 1.

In some embodiments the method may further comprise converting the digital output signal indicative of the sensor input signal into a binary format.

In some embodiments a plurality of interferometers may each provide a different output. The plurality of interferometers may be arranged in parallel with each other. The plurality of interferometers may be provided on a monolithic substrate or on a single chip.

In some embodiments one interferometer may receive the sensor input signal a plurality of times and provide a plurality of different output signals at different sensitivities.

In some embodiments the sensor input signals may control the interference of the electromagnetic input signal by the at least one interferometer by introducing a phase shift into the at least one interferometer.

In some embodiments the electromagnetic input signal may comprise a plurality of coherent components.

In some embodiments the electromagnetic input signal may be provided by a laser or a single photon.

In some embodiments the method may further comprise converting the plurality of outputs of the at least one interferometer from an electromagnetic signal to an electrical signal.

According to various, but not necessarily all, embodiments of the disclosure there is also provided a computer program comprising computer program instructions that, when executed by at least one processor, enable: configuring at least one interferometer to cause interference of an electromagnetic input signal where the interference of the electromagnetic input signal by the at least one interferometer is controlled by a received sensor input signal; configuring the at least one interferometer to provide a plurality of outputs where each of the plurality of outputs is provided by the at least one interferometer responding to the at least one sensor input signal with a different sensitivity; and detecting the plurality of outputs of the at least one interferometer and providing a digital output signal indicative of the at least one sensor input signal.

In some embodiments there may be provided a computer program comprising program instructions for causing a computer to perform the method as described above.

In some embodiments there may be provided a physical entity embodying the computer program as described above.

In some embodiments there may be provided an electromagnetic carrier signal carrying the computer program as described above.

The apparatus may be for providing a measurement of a physical characteristic.

BRIEF DESCRIPTION

For a better understanding of various examples of embodiments of the present invention reference will now be made by way of example only to the accompanying drawings in which.

DETAILED DESCRIPTION

The Figures illustrate an apparatus 1 comprising: at least one interferometer 11 where the at least one interferometer 11 is configured to cause interference of an electromagnetic input signal 7; wherein the at least one interferometer 11 is configured to receive at least one sensor input signal 9 from at least one sensor 5 such that the sensor input signal 9 controls the interference of the electromagnetic input signal 7 by the at least one interferometer 11; wherein the at least one interferometer 7 is configured to provide a plurality of outputs 13 where each of the plurality of outputs 13 is provided by the at least one interferometer 11 responding to the at least one sensor input signal 9 with a different sensitivity; and at least one detector 15 configured to detect the plurality of outputs 13 of the at least one interferometer 7 and provide a digital output signal 17 indicative of the at least one sensor input signal 9.

Figure 1:
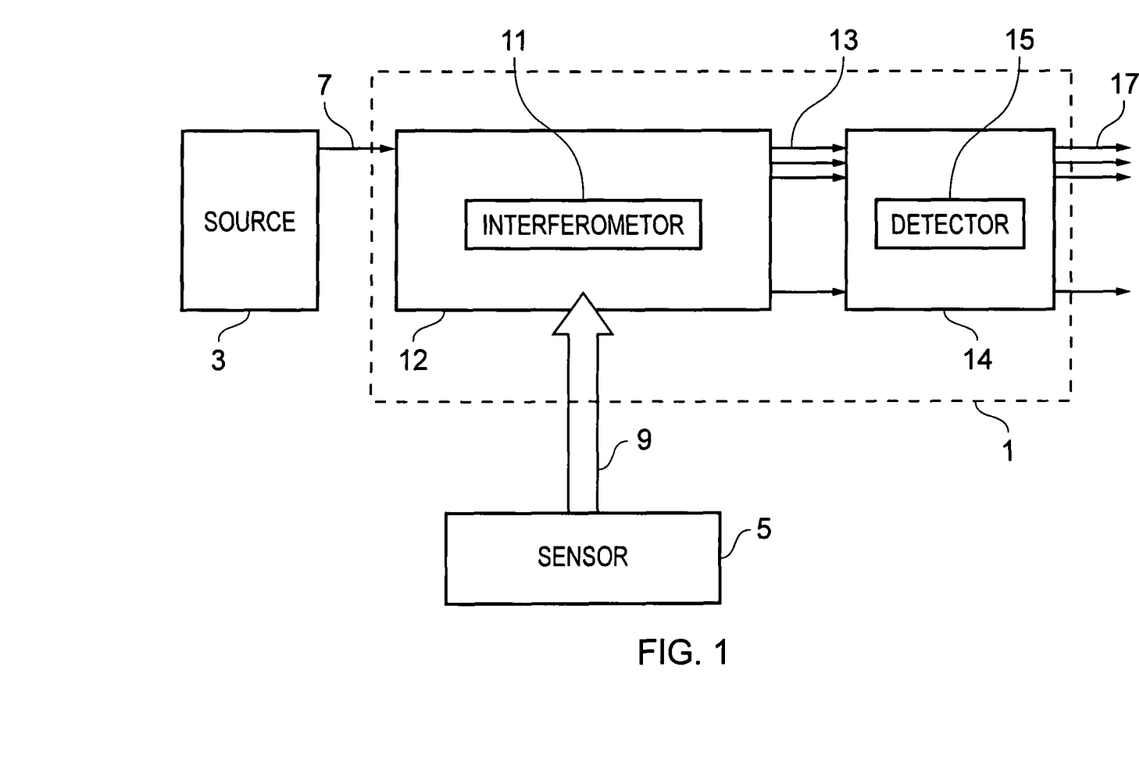
FIG. 1 schematically illustrates an apparatus according to embodiments of the disclosure.

FIG. 1 schematically illustrates an apparatus 1 according to embodiments of the disclosure. As described below the apparatus 1 is configured to enable one or more interferometers 11 to be used to convert the output of sensor 5 into a digital output signal 17.

In the following description, unless expressly stated otherwise, the words "connect" and "couple" and their derivatives mean operationally connected or operationally coupled. It is to be appreciated that any number or combination of intervening components can exist including no intervening components.

The exemplary apparatus 1 schematically illustrated in FIG. 1 comprises at least one interferometer 11 and at least one detector 15 which are described in more detail below.

The at least one interferometer 11 may comprise any means which may be configured to receive an electromagnetic input signal 7 and cause interference of the received electromagnetic input signal 7. In embodiments of the disclosure the interference of the received electromagnetic input signal 7 may be caused by adding a phase shift to the electromagnetic input signal 7. The phase shift which is added may be controlled by an input signal 9 received from a sensor 5.

In some exemplary embodiments of the disclosure at least some of the interferometers 11 may be tunable so that the amount of phase difference introduced by a received input signal 9 may be varied. In such embodiments the apparatus 1 may be coupled to a controller to enable the apparatus 1 to receive the appropriate control input signals.

In some exemplary embodiments of the disclosure the at least one interferometers 11 may comprise one or more Mach-Zehnder interferometers. In other embodiments of the disclosure other types of interferometers may be used.

In some embodiments of the disclosure a plurality of interferometers 11 may be provided. The plurality of interferometers may be arranged in parallel with each other so that each interferometer 11 receives the same electromagnetic input signal 7 but the phase difference added to the electromagnetic input signal by each interferometer 11 is independent of the phase difference added by the other interferometers 11. The plurality of interferometers 11 may be arranged on a single chip 12 or other monolithic substrate.

In some exemplary embodiments of the disclosure the at least one interferometer 11 may be lossless so that there is no attenuation of the electromagnetic input signal 7 as it passes through the at least one interferometer 11.

In the exemplary embodiment of FIG. 1 the apparatus 1 is coupled to a source 3 of electromagnetic radiation so that the at least one interferometer 11 is configured to receive an electromagnetic input signal 7 from the source 3 of electromagnetic radiation.

The source 3 of electromagnetic radiation may comprise any suitable source of electromagnetic input signals. For example the source 3 of electromagnetic radiation may comprise a laser or single photon input.

The electromagnetic input signal 7 may comprise any type of electromagnetic radiation. In some embodiments of the invention the electromagnetic input signal 7 may comprise ultra violet light, visible light or infra red radiation. The electromagnetic input signal 7 may have a wavelength of between 100 and 2500 nm. In some embodiments of the disclosure the wavelength of the electromagnetic input signal 7 may be about 1550 nm.

In some exemplary embodiments of the disclosure the electromagnetic input signal 7 may comprise a plurality of coherent components. As the components are coherent the components will interfere with each other depending on the phase difference that is added between the components. The at least one interferometers 11 may be configured to introduce phase differences between components of the electromagnetic input signal 7 and so cause interference between the respective components.

The apparatus 1 is also configured to be coupled to one or more sensors 5. The one or more sensors 5 may comprise any means for detecting or measuring a physical variable and providing a sensor input signal 9 as an output. The sensor input signal 9 may be provided to the apparatus 1 and may be dependent upon the measured or detected a physical variable. The sensor input signal 9 may provide an indication of a physical variable which has been measured by the sensor 5.

The type of sensor 5 which is used may depend upon the physical variable that is to be detected or measured. In some exemplary embodiments of the disclosure the physical variable which is measured by the sensor 5 may include temperature, atmospheric conditions, pressure, noise, the presence of a chemical or any other physical variable.

The apparatus 1 may be coupled to the sensor 5 so that the output of the sensor 5 is received by the at least one interferometer 11 as a sensor input signal 9. The sensor input signal 9 may control the phase difference added to the components of the electromagnetic input signal 7 by the at least one interferometer 11. This causes the amount of interference between the components of the electromagnetic input signal 7 to be varied so that the output signals 13 which are provided by the at least one interferometer 11 provide an indication of the physical variable measured by the sensor 5.

In embodiments of the invention where a plurality of interferometers 11 are provided each of the plurality of interferometers 11 may be configured to have a different sensitivity for responding to the sensor input signal 9. The sensitivity of an interferometer 11 is a measure of the magnitude of the response of the interferometer 11 to a sensor input signal 9. An interferometer 11 having sensitivity x would introduce a phase shift of x for a given input value y of the sensor input signal 9. Where each of the plurality of interferometers 11 is configured to have a different sensitivity, each of the plurality of interferometers 11 may introduce a different phase shift x.

The exemplary apparatus 1 illustrated in FIG. 1 also comprises at least one detector 15. The detector 15 may comprise any means which is configured to detect the outputs 13 provided by the at least one interferometer 11 and convert the plurality of outputs 13 from electromagnetic signals to electrical output signals 17.

In some exemplary embodiments of the disclosure the at least one detector 15 may comprise a threshold detector 15. The threshold detector may be configured to provide a positive output "1" if the received input signal 13 is above a threshold and a negative output "0" if the received input signal 13 is below a threshold. It is to be appreciated that in other embodiments of the invention other types of detectors may be used which need not be threshold detectors.

In some embodiments of the disclosure a plurality of detectors 15 may be provided in parallel so that each output of a plurality of interferometers 11 is provided to a different detector 15. In such embodiments the plurality of detectors may be provided on a single chip 14 or other monolithic substrate. In other embodiments a single detector 15 may be provided which may be configured to receive a plurality of inputs sequentially. The plurality of inputs 13 may be provided from a plurality of interferometers 11 or from a single interferometer 11.

When the apparatus 1 is in use the sensor 5 provides a sensor input signal 9 to the apparatus 1 indicative of a measured or detected physical variable. The sensor input signal 9 is used to control the amount of interference introduced by the interferometers 11 within the apparatus 1.

In some embodiments of the invention the apparatus 1 may also be configured to be coupled to a controller. The controller may be which is configured to provide one or more control inputs to the interferometers 11. This may enable the sensitivities of the interferometers 11 to be controlled or calibrated.

The plurality of output signals 13 which are provided by the at least one interferometer 11 are dependent upon the sensor input signal 9 so the plurality of output signals 13 provide an indication of the measured or detected physical variable.

The detectors 15 convert the plurality of outputs 13 of the at least one interferometer 11 from an electromagnetic signal to an electrical output signal 17. In embodiments where the detectors 15 comprise threshold detectors the outputs provided the detectors are either 1 or 0. Therefore the output of the apparatus 1 comprises a digital output comprising a series of digits which may have a value of either 0 or 1. The digital output 17 of the apparatus 1 may be in a format which may be processed by a processor. In some exemplary embodiments the digital output 17 of the apparatus 1 may need to be converted into a standard binary format before it may be used by a processor.

Figure 2:
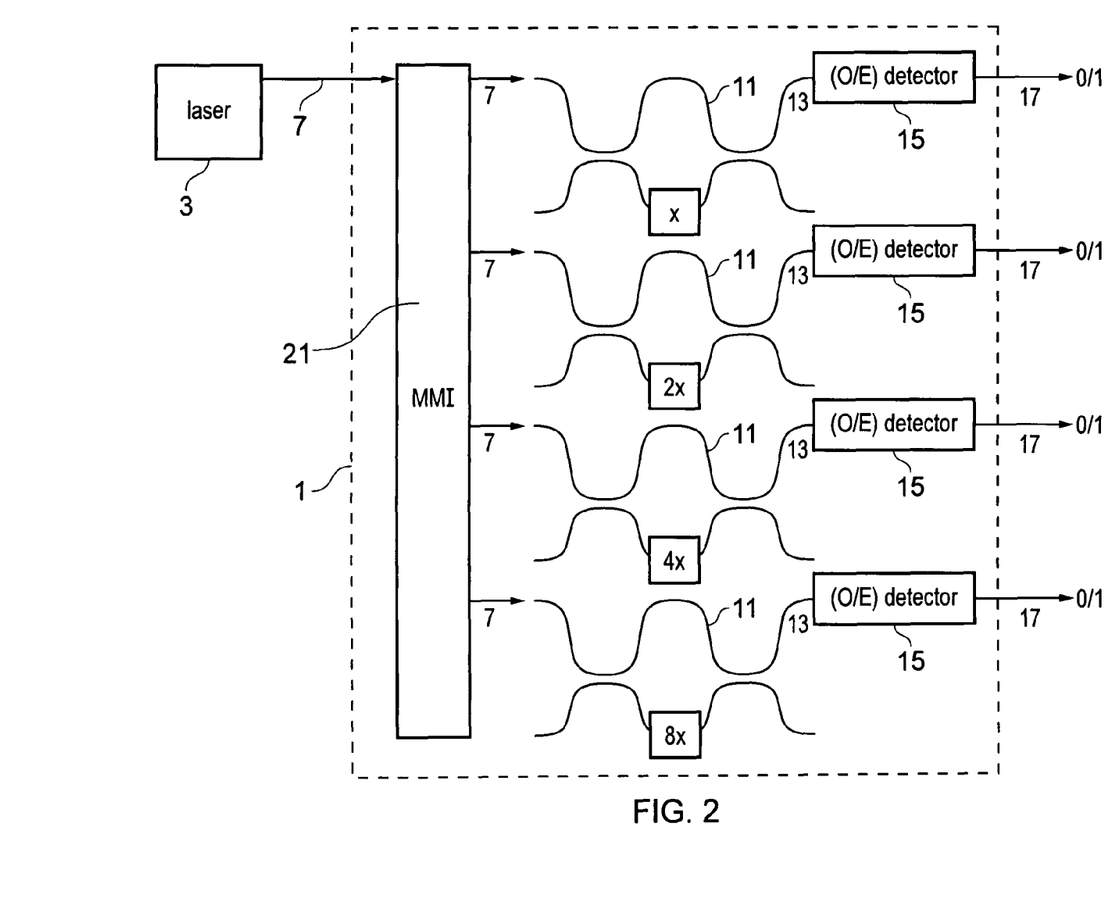
FIG. 2 schematically illustrates an apparatus according to embodiments of the disclosure in more detail

FIG. 2 illustrates an apparatus 1 according to embodiments of the disclosure in more detail. As described above, in relation to FIG. 1, the apparatus 1 comprises at least one interferometer 11 and at least one detector 15. In the exemplary embodiment of FIG. 2 the apparatus comprises a plurality of interferometers 11 and a plurality of detectors 15.

The apparatus 1 is also coupled to a source 3 of electromagnetic radiation which is configured to provide an electromagnetic input signal 7 to the apparatus 1. In the embodiment illustrated in FIG. 2 the source 3 of electromagnetic radiation is a laser. It is to be appreciated that other suitable sources of electromagnetic radiation may be used in other embodiments of the disclosure.

The apparatus 1 may also be coupled to a sensor 5 which is configured to provide a sensor input signal 9 to the apparatus 1 however the sensor 5 and sensor input signal 9 are not illustrated in FIG. 2.

The apparatus 1 illustrated in FIG. 2 comprises a multimode interferometer 21 which is configured to split the electromagnetic input signal 7 into a plurality of electromagnetic input signals. In some exemplary embodiments of the disclosure each electromagnetic input signal provided by the multimode interferometer 21 may be equivalent, for example, each electromagnetic input signal may have the same intensity, phase and wavelength. In other embodiments of the invention the respective electromagnetic input signals might not be equivalent to each other. In other embodiments of the disclosure other means for splitting an electromagnetic input signal 1 into a plurality of signals may be used.

In the exemplary embodiment illustrated in FIG. 2 four interferometers 11 are provided. Each of the interferometers 11 have a different sensitivity so that for a given sensor input each of the interferometers 11 introduces a different phase shift in response to a given sensor input signal. This causes each interferometer 11 to provide a different output signal 13 to the detector 15.

In the specific example illustrated in FIG. 2 the first interferometer 11 has sensitivity x so that for a given sensor input signal 9 having a value y a phase shift of x is introduced by the first interferometer 11 into the electromagnetic input signal 7. The sensitivity of each of the other interferometers 11 is related to the sensitivity of the first input by a factor of $2^i$. That is, the second interferometer 11 has a sensitivity 2x so that for a given sensor input signal 9 having a value y a phase shift of 2x is introduced by the second interferometer 11 into the electromagnetic input signal 7. Similarly the third interferometer 11 has a sensitivity 4x so that for a given sensor input signal 9 having a value y a phase shift of 4x is introduced by the third interferometer 11 into the electromagnetic input signal 7 and the fourth interferometer 11 has a sensitivity 8x so that for a given sensor input signal 9 having a value y a phase shift of 8x is introduced by the fourth interferometer 11 into the electromagnetic input signal 7.

It is to be appreciated that in other embodiments of the disclosure any number of interferometers may be provided. The sensitivity of each of the interferometers 11 may double for every additional interferometer 11 so that so that the different sensitivities provided by each of the interferometers have a value of $2^{i-1}x$ where x is a value of a phase shift introduced by the interferometer 11 in response to a given sensor input signal, N is the number of interferometers 11 and each of the interferometers 11 is associated with a unique positive integer value of i between 1 and N. The number of interferometers 11 may be the same as the number of outputs provided to the detectors 15 so that each of the outputs 13 may also be associated with a unique positive integer value of i between 1 and N.

Having the sensitivities of the plurality of interferometers 11 in such ratios may enable the outputs 13 of the plurality of interferometers 11 to be converted into a digital output more easily. Having all of the ratios as a factor of $2^i$ may also enable the digital output to be converted into a standard binary output more easily.

In the exemplary embodiment of FIG. 2A four detectors 15 are provided so that each of the plurality of output signals 13 provided by each of the interferometers 11 is provided to a different detector 15. In the exemplary embodiment of FIG. 2A the detector 15 is a threshold detector which provides either a positive or negative output depending on the intensity of the signal 13 provided from the interferometer 11.

In the embodiment illustrated in FIG. 2 each of the detectors may be identical so that there are no discrepancies added to the output signal of the apparatus 1 by the detectors 15.

Figure 3:
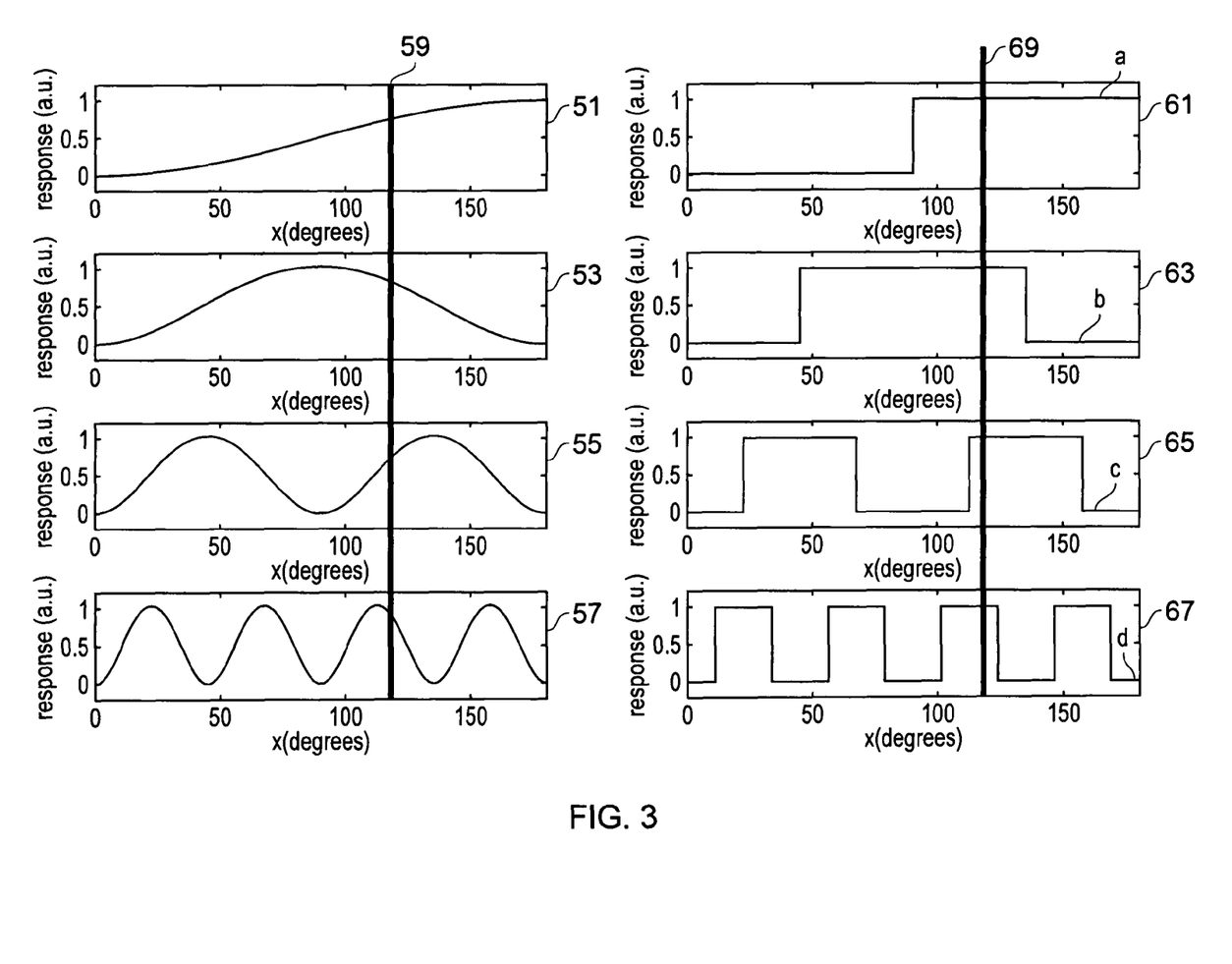
FIG. 3 is a plot illustrating outputs which may be provided by the apparatus in embodiments of the disclosure.

FIG. 3 illustrates outputs which may be provided by each of the interferometers 11 and the detectors 15 in the exemplary apparatus 1 illustrated in FIG. 2.

The left hand plots correspond to the output signals 13 provided by the interferometers 11. The output signals are electromagnetic signals which have a phase shift introduce by the interferometer 11 through which the electromagnetic signal has passed. As each interferometer 11 has a different sensitivity each interferometer 11 introduce a different phase shift into the electromagnetic signal.

The intensity may be measured in any suitable units and in the plots in FIG. 3 is given as a value between 0 and 1.

In the example of FIG. 2 the first interferometer 11 has a sensitivity x and so the first plot 51 in FIG. 3, which indicates a measure of the intensity of the output signal 13, corresponds to 0.5*(1−cos(x)). The second interferometer has a sensitivity 2x and so the second plot 53 in FIG. 3 corresponds to 0.5*(1−cos(2x)). Similarly the third interferometer has a sensitivity 4x and so the third plot 55 in FIG. 3 corresponds to 0.5*(1−cos(4x)) and the fourth interferometer has a sensitivity 8x and the fourth plot 57 in FIG. 3 corresponds to 0.5*(1−cos(8x)).

The right hand plots correspond to the outputs provided by each of the detectors. If the intensity of the output 13 of the interferometer 11 is below 0.5 then the respective detectors provide a negative output or "0". Conversely if the intensity of the output 13 of the interferometer 11 is above 0.5 then the respective detectors provide a positive output or "1".

The first right hand plot 61 corresponds to the output 17 from the first detector 15 and switches from 0 to 1 when the phase difference added corresponds to approximately 90 degrees. The plot 61 has a period of approximately 360 degrees. The second right hand plot 63 corresponds to the output 17 from the second detector 15 and switches from 0 to 1 when the phase difference added corresponds to approximately 45 degrees and back to zero when the phase difference added corresponds to approximately 135 degrees. The plot 63 has a period of approximately 180 degrees. Similarly the third right hand plot 65 corresponds to the output 17 from the third detector 15 which switches from 0 to 1 at approximately 22.5 degrees and back to 0 at approximately 67.5 degrees and has a period of approximately 90 degrees. The fourth right hand plot 67 corresponds to the output 17 from the fourth detector 15 which switches from 0 to 1 at approximately 11 degrees and back to 0 at approximately 34 degrees and has a period of approximately 45 degrees.

The output 17 provided by the apparatus illustrated in FIG. 2 comprises a component provided by each of the detectors 15 and so comprises a series of four digits where each digit is either a 0 or a 1. There are 16 different possible digital outputs which may be provided by the detectors which enables the outputs to be measured to an accuracy of $\frac{1}{16}^{th}$ of half of the period of the least sensitive interferometer 11. In this example the accuracy is therefore 11.25 degrees. The accuracy of the apparatus 1 may be increased by using more interferometers 11 with a higher sensitivity.

The digital output 17 provided by the apparatus 1 illustrated in FIG. 2 is not in the standard binary format. In some embodiments of the disclosure the apparatus 1 may be coupled to means for converting the digital output 17 of the apparatus 1 to a standard binary format. The means for converting the digital output 17 of the apparatus 1 to a standard binary format may comprise any suitable means such as a processor programmed with suitable program instructions or an application specific integrated circuit (ASIC).

An exemplary algorithm which could be used to convert the output 17 of the detectors 15 of the apparatus 1 illustrated in FIG. 2 into a standard binary format may use a function such as the XOR (exclusive or) function.

For example, if the output of the detectors is abcd where a is the output of the first detector, b is the output of the second detector, c is the output of the second detector and d is the output of the fourth detector, then a standard binary output may be obtained from the outputs 17 illustrated in FIG. 3 by using the algorithm:

$$A=a,$$
$$B=A \text{ XOR } b,$$
$$C=B \text{ XOR } c,$$
$$D=C \text{ XOR } d.$$

A similar algorithm may also be used where there are a different number of interferometers 11. For example where the apparatus 1 comprises N interferometers 11 the standard binary code s may be obtained from the raw digital data r provided by the apparatus 1 by using the algorithm:

```
s_N=r_N
for j=1:1:N−1
    s_(N−j)=s_(N−j+1) XOR r_(N−j)
end
``` where the values of N are assigned sequentially to the interferometers 11 so that the least sensitive interferometer 11 has i=N and the most sensitive interferometer 11 has i=1.

In FIG. 3 the lines 59 and 69 indicate a calculation which has been made. This has introduced a phase difference of approximately 120 degrees into the first interferometer 11. The digital output 17 provided by the apparatus 1 is 1111 and after applying the algorithm described above, this gives the binary output of 1010

Figure 4:
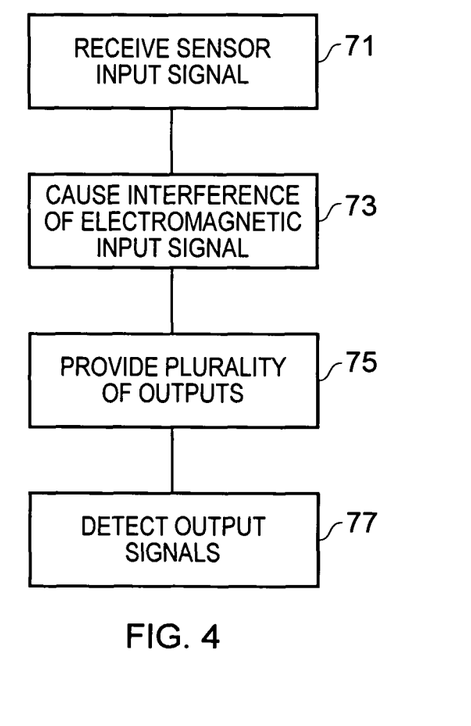
FIG. 4 is a block diagram of a method of using the apparatus according to embodiments of the disclosure.

FIG. 4 illustrates a method according to embodiments of the disclosure.

At block 71 the apparatus 1 receives at least one sensor input signal 9 from at least one sensor 5. The sensor 5 and sensor input signal 9 may be as described above in relation to FIG. 1 so that the sensor input signal 9 provides an indication of a real world physical variable which has been measured or detected by the sensor 5.

At block 73 at least one interferometer 11 is configured to cause interference of an electromagnetic input signal 7. The electromagnetic input signal 7 may be provided to the apparatus 1 as described above in relation to FIGS. 1 and 2.

The interference of the electromagnetic input signal 7 by the at least one interferometer 11 may be caused by the at least one interferometer 11 introducing a phase shift into the electromagnetic input signal 7. The amount of phase shift added to the electromagnetic input signal 7 may be controlled by the sensor input signal 9 so that the amount of phase shift added by the at least one interferometer 11 corresponds to the sensor input signal 9 which is received by the apparatus 1 in block 71.

At block 75 a plurality of outputs 13 are provided by the at least one interferometer 11. As the amount of phase shift added by the at least one interferometer 11 corresponds to the sensor input signal 9 the plurality of outputs 13 of the at least one interferometer 11 provide an indication of the value of physical variable measured by the sensor 5.

Each of the outputs 13 provided at block 75 may be provided by the at least one interferometer 11 responding to the at least one sensor input signal 9 with a different sensitivity as described above in relations to FIGS. 1 to 3. In some embodiments of the disclosure a plurality of different interferometers 11 may be provided and each interferometer 11 may have a different sensitivity so that each interferometer 11 provides a different output in response to the same sensor input signal 9. In other embodiments of the disclosure the same interferometer 11 may be configured to provide a plurality of different outputs 13 each at different sensitivities.

At block 77 the output signals 13 of the at least one interferometer 11 are detected. The detected electromagnetic output signal 13 may then be converted into a digital output signal 17 to provide a digital output signal indicative of the at least one sensor input signal 9. The digital output signal 17 may comprise a series of digits where each digit is either a 0 or 1. As described above, the detectors 15 used may comprise threshold detectors which provide either a negative or positive output.

The blocks illustrated in the FIG. 4 may represent steps in a method and/or sections of code in a computer program. The illustration of a particular order to the blocks does not necessarily imply that there is a required or preferred order for the blocks and the order and arrangement of the block may be varied. Furthermore, it may be possible for some blocks to be omitted.

Embodiments of the disclosure provide a simple apparatus 1 which may be used to convert analogue sensor input signals into digital output signals. The embodiments of the disclosure do not require any additional circuitry such as analogue to digital converters, amplifiers or feedback circuits in order to provide the digital output.

The apparatus 1 of the embodiments of the disclosure also has a low power usage as the digital outputs are provided directly by the apparatus 1 without the need for any additional circuitry.

Also the embodiments of the disclosure can be used with any suitable sensors. This enables the apparatus 1 to be used in a wide range of applications. In some embodiments of the disclosure the apparatus 1 may be implemented within a device such as an electronic communication device, for example a mobile telephone.

Although embodiments of the present invention have been described in the preceding paragraphs with reference to various examples, it should be appreciated that modifications to the examples given can be made without departing from the scope of the invention as claimed. For example in the above described embodiments a plurality of interferometers 11 are provided. However, it is to be appreciated that in alternative embodiments of the disclosure a single interferometer 11 may be used and the same input signal 9 may be provided to the single interferometer 11 a plurality of times. The phase difference provided by the same interferometer 11 may be controlled to provide a plurality of different output signals 13 with different phase shifts introduced corresponding to different sensitivities of the interferometer 11. The sensitivity may be controlled in any suitable manner, for example, the sensitivity may be controlled by an input signal provided by a controller, by varying the amount of time to which the interferometer 11 receives the sensor input signal or any other suitable means.

In some exemplary embodiments of the disclosure the value of the sensor input signal 9 may be calibrated by providing known sensor input signals to the apparatus 1. In some embodiments a control signal may also be provided to the apparatus 1 to control the phase difference added by the interferometers 11. This may allow for calibration of the apparatus 1 or for fine tuning of the apparatus 1.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   at least one interferometer where the at least one interferometer is configured to cause interference of an electromagnetic input signal;
   wherein the at least one interferometer is configured to receive at least one sensor input signal from at least one sensor such that the sensor input signal controls the interference of the electromagnetic input signal by the at least one interferometer;
   wherein the at least one interferometer is configured to provide a plurality of outputs where each of the plurality of outputs is provided by the at least one interferometer responding to the at least one sensor input signal with a different sensitivity; and
   at least one detector configured to detect the plurality of outputs of the at least one interferometer and provide a digital output signal indicative of the at least one sensor input signal.

2. The apparatus as claimed in claim 1, wherein each of the different sensitivities provided by the at least one interferometer has a value $2^{i-1}x$, where x is a value of a phase shift introduced by the at least one interferometer in response to a sensor input signal and N is the number of outputs provided and each of the outputs is associated with a unique positive integer value of i between 1 and N.

3. The apparatus as claimed in claim 1, wherein the digital output signal indicative of the at least one sensor input signal comprises a series of digits where each digit is either a 0 or 1.

4. The apparatus as claimed in claim 1, wherein the apparatus is configured to convert the digital output signal indicative of the sensor input signal into a binary format.

5. The apparatus as claimed in claim 1, wherein the apparatus comprises a plurality of interferometers.

6. The apparatus as claimed in claim 5, wherein the interferometers are arranged in parallel with each other.

7. The apparatus as claimed in claim 5, wherein the interferometers are provided on a monolithic substrate.

8. The apparatus as claimed in claim 7, wherein the interferometers are provided on a single chip.

9. The apparatus as claimed in claim 1, wherein the apparatus comprises at least one interferometer which is configured to receive the same sensor input signal a plurality of times and provide a plurality of different output signals at different sensitivities.

10. The apparatus as claimed in claim 1, wherein the sensor input signals control the interference of the electromagnetic input signal by the at least one interferometer by introducing a phase shift into the at least one interferometer.

11. The apparatus as claimed in claim 1, wherein the electromagnetic input signal comprises a plurality of coherent components.

12. The apparatus as claimed in claim 1, wherein the electromagnetic input signal is provided by at least one of a laser or a single photon.

13. The apparatus as claimed in claim 1, wherein the at least one interferometer comprises a plurality of interferometers, the apparatus further comprising a multimode interferometer configured to split a single electromagnetic input signal to provide a plurality of electromagnetic input signals, and each one of the plurality of interferometers is configured to receive one of the plurality of electromagnetic input signals.

14. The apparatus as claimed in claim 1, wherein the digital output signal indicative of the sensor input signal comprises a plurality of first binary digits, and the apparatus is configured to convert the digital output signal into a binary format comprising a plurality of second binary digits, wherein one of the second binary digits is determined from two or more of the first binary digits.

15. A method comprising;
receiving at least one sensor input signal from at least one sensor;
configuring at least one interferometer to cause interference of an electromagnetic input signal where the interference of the electromagnetic input signal by the at least one interferometer is controlled by the sensor input signal;
providing a plurality of outputs where each of the plurality of outputs is provided by the at least one interferometer responding to the at least one sensor input signal with a different sensitivity; and
detecting the plurality of outputs of the at least one interferometer and providing a digital output signal indicative of the at least one sensor input signal.

16. The method as claimed in claim 15, wherein each of the different sensitivities provided by the at least one interferometer has a value $2^{i-1}x$, where x is a value of a phase shift introduced by the at least one interferometer in response to a sensor input signal and N is the number of outputs provided and each of the outputs is associated with a unique positive integer value of i between 1 and N.

17. The method as claimed in claim 15, further comprising converting the digital output signal indicative of the sensor input signal into a binary format.

18. The method as claimed in claim 15, wherein a plurality of interferometers each provide a different output.

19. A computer program product comprising a non-transitory computer-readable storage medium bearing computer program code embodied therein for use with a computer, the computer program code comprising code for performing the method of claim 15.

20. A computer program product comprising a non-transitory computer-readable storage medium bearing computer program code embodied therein for use with a computer, the computer program code comprising code for performing at least the following:
configuring at least one interferometer to cause interference of an electromagnetic input signal where the interference of the electromagnetic input signal by the at least one interferometer is controlled by a received sensor input signal;
configuring the at least one interferometer to provide a plurality of outputs where each of the plurality of outputs is provided by the at least one interferometer responding to the at least one sensor input signal with a different sensitivity; and
detecting the plurality of outputs of the at least one interferometer and providing a digital output signal indicative of the at least one sensor input signal.

* * * * *